(12) United States Patent
Agramontt Diaz

(10) Patent No.: US 12,262,842 B2
(45) Date of Patent: Apr. 1, 2025

(54) DEVICE FOR TREATING FLUIDS AND ASSOCIATED METHOD

(71) Applicant: Daxtro Wasser Technik Sagl, Giubiasco (CH)

(72) Inventor: Jaime Orlando Agramontt Diaz, Magliaso (CH)

(73) Assignee: Daxtro Wasser Technik SAGL, Giubiasco (CH)

( * ) Notice: Subject to any disclaimer, the term of this patent is extended or adjusted under 35 U.S.C. 154(b) by 442 days.

(21) Appl. No.: 17/765,827

(22) PCT Filed: Sep. 30, 2020

(86) PCT No.: PCT/IB2020/059167
§ 371 (c)(1),
(2) Date: Mar. 31, 2022

(87) PCT Pub. No.: WO2021/064607
PCT Pub. Date: Apr. 8, 2021

(65) Prior Publication Data
US 2022/0330746 A1    Oct. 20, 2022

(30) Foreign Application Priority Data
Oct. 1, 2019   (CH) ...................... 1244/19

(51) Int. Cl.
*A47J 31/60*       (2006.01)
*C02F 1/48*        (2023.01)

(52) U.S. Cl.
CPC .............. *A47J 31/60* (2013.01); *C02F 1/485* (2013.01); *C02F 1/487* (2013.01); *C02F 2303/04* (2013.01); *C02F 2307/10* (2013.01)

(58) Field of Classification Search
CPC ........... A47J 31/60; C02F 1/485; C02F 1/487; C02F 2303/04; C02F 2307/10

(Continued)

(56) References Cited

U.S. PATENT DOCUMENTS

| | | | |
|---|---|---|---|
| 5,113,751 A | 5/1992 | Holcomb | |
| 5,514,283 A | 5/1996 | Stefanini | |

(Continued)

FOREIGN PATENT DOCUMENTS

| | | | |
|---|---|---|---|
| CN | 106277368 B | 5/2019 | |
| EP | 0493559 B1 * | 12/1995 | |
| WO | WO-9508510 A1 * | 3/1995 | ............. B01J 19/12 |

OTHER PUBLICATIONS

European Patent Office, International Search Report for PCT/IB2020/059167, Dec. 23, 2020, P.B. 5818 Patentlaan 2, NL—2280 HV Rijswijk.

(Continued)

*Primary Examiner* — Fred Prince

(57) ABSTRACT

A device for treating fluids, comprising: —at least one electromagnetic field inductor element made of magnetically permeable material, configured to be coupled at a predetermined distance with respect to a duct within which said fluids flow in use, —a radiofrequency generator, comprising an output configured to supply a radiofrequency signal to the electromagnetic field inductor element; —wherein said radio frequency generator comprises an operating configuration in which it generates a signal comprising at least one pulses packet in turn comprising at least a first pulses train and a second pulses train; said first pulses train having a first predefined frequency; said second pulses train having a second predefined frequency; said first predefined frequency being distinct from the second predefined frequency.

20 Claims, 3 Drawing Sheets

(58) Field of Classification Search
USPC .......................... 210/695, 222, 223; 222/190
See application file for complete search history.

(56) References Cited

U.S. PATENT DOCUMENTS

2007/0029261 A1   2/2007   Chew
2017/0101327 A1   4/2017   Suvorov

OTHER PUBLICATIONS

European Patent Office, Written Opinion of the International Searching Authority for PCT/IB2020/059167, Dec. 23, 2020, P.B. 5818 Patentlaan 2, NL—2280 HV Rijswijk.
European Patent Office, Searching Strategy for PCT/IB2020/059167, Dec. 23, 2020, P.B. 5818 Patentlaan 2, NL—2280 HV Rijswijk.

* cited by examiner

DEVICE FOR TREATING FLUIDS AND ASSOCIATED METHOD

TECHNICAL FIELD

The object of the present disclosure relates to the field of the water treatment sector and in detail concerns a device for treating fluids.

The present disclosure also relates to a method for treating fluids.

The present disclosure also relates to a machine for distributing beverages which comprises said device for treating fluids.

BACKGROUND

The treatment of fluids, in particular for the purpose of disinfection or decontamination, has been the subject of advanced studies for some time, given the growing need to obtain increasingly pure and bacteria-free fluids.

In particular for waters, and in particular for domestic and/or drinking waters, the treatment in terms of decontamination has recently been the subject of several studies. The community of operators has in fact realized that domestic and/or drinking waters are often impure, too impure for the intended use thereof, and contains impurities such as limescale and/or rust (or oxides of ferrous material) to an extent that significantly negatively affects the life of appliances or devices, or human health.

In fairly recent times, the presence of harmful bacteria for humans has been observed, including *Legionella* and/or *Pseudomonas*. This is a gram-negative bacterium, which has been found to be prolific in conditions of stagnation, encrustations and sediments, in the presence of biofilms or amoebas.

In particular, it has been observed that bacteria which may be present in domestic and/or drinking waters are difficult to eradicate. For example, *Legionella* can proliferate with temperatures higher than 22° C., being able to survive even at much lower temperatures, and withstand even high pH conditions, surviving significantly. Among the various types of *Legionella*, *Legionella pneumophila* has also been found in waters for civilian use and is connected with most cases of infections or outbreaks of Legionellosis.

The community has been confronted with different techniques for treating waters, and more generally fluids, which comprise filtration, and/or decontamination and/or chemical disinfection, or decontamination and/or disinfection by radiation or electromagnetic induction.

Filtration is complex, and requires costly use of filters, which must often be replaced. Furthermore, filters, in order to be effective, often have to be installed in successive stages. This means that liquid filtration processes are rather long and unsuitable for use near end users.

The chemical treatment, too, requires the use of different types of chemical products that are often difficult or dangerous to handle or supply; the cost associated with chemical treatment is not of secondary importance. The incorrect use of chemical products often causes the risk—not residual—of non-treatment (too low quantity of chemical products) or of poisoning for the end user (too high quantity of chemical products). In hospitals, for example, the use of copper-silver ionization of waters is known to kill *Legionella* bacteria.

In the specific treatment of *Legionella* in waters, overheating with temperatures of up to 70° C. or 80° C. is also known, which however cannot always be easily performed and/or may not always be carried out for a sufficient time, especially in ducts with fast water flow and/or near end users such as taps or beverage distribution systems or devices.

The treatment of fluids by means of radiation processes, for example with ultraviolet radiation, to which *Legionella* is particularly sensitive, implies the need for continuous irradiation of the water for a few seconds and is difficult to implement, especially when the water flows inside ducts.

The treatment of fluids by electromagnetic processes involves the use of electromagnetic fields in the fluid, which with regards to the proposed action cause the dissolution, or deposition, or destruction of impurity elements such as limescale and/or iron oxides, or bacteria. An example of this type of device is known from WO2017018944.

The object of the present disclosure is to describe a device and a method for treating fluids which concur to optimize the dissolution, deposition or destruction of elements of impurities such as limescale and/or iron oxides, and bacteria.

SUMMARY

The object of the present disclosure is hereinafter described in accordance with some aspects which can be combined with each other and which can also be combined in accordance with one or more of the appended claims and/or further details present in the detailed description.

According to one aspect, a device for treating fluids (100) is realised, comprising:
  at least one electromagnetic field inductor element (102) made of magnetically permeable material, configured to be coupled in a predefined positional relationship with respect to a duct (400) or tank (200) within which fluids are likely to be present,
  a radiofrequency generator (101), comprising an output (101o) configured to supply a radiofrequency signal to the electromagnetic field inductor element (102);
  wherein said radio frequency generator (101) comprises an operating configuration in which it generates a signal comprising at least one pulses packet (510) in turn comprising at least a first pulses train (103) and a second pulses train (104); said first pulses train (103) having a first predefined frequency (f1), said second pulses train (104) having a second predefined frequency (f2); said first predefined frequency (f1) being distinct from the second predefined frequency (f2).

According to a further non-limiting aspect, the electromagnetic field inductor element (102) is configured to be coupled to the duct (400), in particular at a predetermined distance with respect to the duct (400) within which said fluids flow in use.

According to a further non-limiting aspect, each of the pulses of the first pulses train (103) has, as its own frequency, said first predefined frequency (f1) and each of the pulses of the second pulses train (104) has, as its own frequency, said second predefined frequency (f2).

According to a further non-limiting aspect, the first predefined frequency (f1) is the own frequency of each of the pulses of the first pulses train (103) and the second predefined frequency (f2) is the own frequency of each of the pulses of the second pulses train (104).

According to a further non-limiting aspect, the radiofrequency generator (101) is configured to generate pulses and/or pulses trains of the square wave type.

According to a further non-limiting aspect, in at least one of said first and second pulses trains (103, 104), the pulses of the respective pulses train (103, 104) follow one another seamlessly.

According to a further non-limiting aspect, the device comprises a first electromagnetic field inductor element (102) and a second electromagnetic field inductor element (102); said first electromagnetic field inductor element (102) and said second electromagnetic field inductor element (102) being supplied independently or alternatively synchronously.

According to a further non-limiting aspect, the electromagnetic field inductor element (102) is configured to be applied at a recess (201) of a tank (200), in particular a recess that is convex towards the outside of said tank.

According to a further non-limiting aspect, said tank (200) is a tank of a machine for distributing beverages.

According to a further non-limiting aspect, said first pulses train (103) has a frequency lower than the frequency of said second pulses train (104), and/or the first predefined frequency (f1) is lower than the second predefined frequency (f2).

According to a further non-limiting aspect, the at least a first pulses train (103) and the at least a second pulses train (104) are placed in a time sequence in said pulses packet (510) in accordance with a predefined order.

According to a further non-limiting aspect, the at least a first pulses train (103) and the at least a second pulses train (104) are placed in a time sequence in said pulses packet (510) in accordance with a random order.

According to a further non-limiting aspect, the first pulses train (103) has a first maximum amplitude and said second pulses train (104) has a second maximum amplitude distinct from the first maximum amplitude.

According to a further non-limiting aspect, the second maximum amplitude is lower than the first maximum amplitude.

According to a further non-limiting aspect, the first, and/or second and/or third and/or fourth and/or fifth pulses train (103; 104; 105; 106; 107) has a substantially null average value.

According to a further non-limiting aspect, said pulses packet (510) has a substantially null average value.

According to a further non-limiting aspect, the first pulses train (103) comprises a plurality of pulses, preferably lower than 10 and even more preferably lower than 6, in which at least two pulses of said first pulses train (103), preferably all the pulses of said first pulses train (103) have a peak and/or peak-to-peak amplitude substantially identical to each other.

According to a further non-limiting aspect, the second pulses train (104) comprises a plurality of pulses, preferably lower than 10 and even more preferably lower than 6, wherein at least two pulses of said second pulses train (104), preferably all the pulses of said second pulses train (104), have a substantially equal peak and/or peak-to-peak amplitude.

According to a further non-limiting aspect, the pulses packet (510) comprises pulses having a frequency less than 500 kHz, preferably comprised between 30 kHz and 270 kHz, more preferably comprised between 40 kHz and 260 kHz, even more preferably comprised between 50 kHz and 250 kHz.

According to a further non-limiting aspect, the pulses packet (510) comprises a third pulses train (105), a fourth pulses train (106) and a fifth pulses train (107) placed in a time sequence to said second pulses train (104). According to a further non-limiting aspect, the third pulses train (105) has a third predefined frequency (f3), the fourth pulses train (106) has a fourth predefined frequency (f4), and the fifth pulses train (107) has a predefined fifth frequency (f5) distinguished one another.

According to a further non-limiting aspect, the first pulses train (103), the second pulses train (104), the third pulses train (105), the fourth pulses train (106) and the fifth pulses train (107) are placed in a time sequence in said pulses packet (510) in accordance with a predefined order.

According to a further non-limiting aspect, the first pulses train (103), the second pulses train (104), the third pulses train (105), the fourth pulses train (106) and the fifth pulses train (107) are placed in a time sequence in said pulses packet (510) in accordance with a random order.

According to a further non-limiting aspect, the first predefined frequency is comprised between 40 kHz and 60 kHz, preferably it is substantially equal to 50 kHz.

According to a further non-limiting aspect, the second predefined frequency is comprised between 80 kHz and 100 kHz, preferably it is substantially equal to 90 kHz.

According to a further non-limiting aspect, the third predefined frequency is comprised between 120 kHz and 140 kHz, preferably it is substantially equal to 130 kHz.

According to a further non-limiting aspect, the fourth predefined frequency is comprised between 210 kHz and 230 kHz, preferably it is substantially equal to 220 kHz.

According to a further non-limiting aspect, the fifth predefined frequency is comprised between 240 kHz and 260 kHz, preferably it is substantially equal to 250 kHz.

According to a further non-limiting aspect, the third predefined frequency (f3) is greater than the second predefined frequency (f2).

According to a further non-limiting aspect, the fourth predefined frequency (f4) is greater than the third predefined frequency (f3).

According to a further non-limiting aspect, the fifth predefined frequency (f5) is greater than the fourth predefined frequency (f4).

According to a further non-limiting aspect, in at least one of said third, fourth and fifth pulses trains (105, 106, 107), the pulses of the respective pulses train (105, 106, 107) follow one another seamlessly.

According to a further non-limiting aspect, each pulses train between said at least a first pulses train (103) and a second pulses train (104), optionally between the first, the second, the third, the fourth and the fifth pulses train (103, 104, 105, 106, 107) has a characteristic pair [peak amplitude (130)-frequency], wherein as the frequency increases, the peak amplitude is reduced and/or wherein the peak amplitude (130) varies with law inversely proportional to the frequency.

According to a further non-limiting aspect, the pulses packet (510) comprises at least a first pulses train (103) with a frequency comprised between 80 kHz and 100 kHz, optionally a first pulses train (103) with a frequency substantially equal to 90 kHz.

According to a further non-limiting aspect, the first pulses train (103) comprises 5 single pulses each of the frequency comprised in the value in accordance with the preceding aspect.

According to a further non-limiting aspect, the pulses packet (510) comprises at least a second pulses train (104) with a frequency comprised between 100 kHz and 130 kHz, optionally a second pulses train (104) with a frequency substantially equal to 111 kHz.

According to a further non-limiting aspect, the second pulses train (104) comprises 5 single pulses each with the frequency comprised in the value in accordance with the preceding aspect.

According to a further non-limiting aspect, the pulses packet (510) comprises at least a third pulses train (105) with a frequency comprised between 130 kHz and 160 kHz, optionally a third pulses train (105) with a frequency substantially equal to 143 kHz.

According to a further non-limiting aspect, the third pulses train (105) comprises 5 single pulses each with the frequency comprised in the value in accordance with the preceding aspect.

According to a further non-limiting aspect, the pulses packet (510) comprises at least a fourth pulses train (106) with a frequency comprised between 160 kHz and 250 kHz, optionally a fourth pulses train (106) with a frequency substantially equal to 200 kHz.

According to a further non-limiting aspect, the fourth pulses train (106) comprises 5 single pulses each with the frequency comprised in the value in accordance with the preceding aspect.

According to a further non-limiting aspect, said radiofrequency generator (101) is configured to generate a predefined number of pulses packets (510) per second.

According to a further non-limiting aspect, the radiofrequency generator (101) is configured to generate a number of pulses packets (510) comprised between 1450 and 1650 packets per second, optionally a number equal to 1550 packets per second, and/or is configured to generate a number of pulses packets (510) comprised between 600 and 750 packets per second, optionally a number equal to 675 packets per second, and/or is configured to generate a number of pulses packets (510) comprised between 500 and 650 packets per second, optionally a number equal to 574 packets per second, and/or is configured to generate a number of pulses packets (510) comprised between 250 and 350 packets per second, optionally a number equal to 306 packets per second, and/or is configured to generate a number of pulses packets (510) substantially comprised between 6000 and 7000 packets per second.

According to a further non-limiting aspect, the number of pulses for each packet is variable between 1 and preferably 10.

According to a further non-limiting aspect, the number of pulses packets (510) is variable in accordance with a random or pseudorandom law.

According to a further non-limiting aspect, the radiofrequency generator (101) is configured to generate a number of pulses packets (510) substantially comprised between 6000 and 7000 packets per second, each comprising a pulses train with a frequency comprised between 40 kHz, and 400 kHz, more preferably comprised between 45 kHz and 350 kHz.

According to a further non-limiting aspect, the radiofrequency generator (101) is a generator configured to generate a number of pulses packets (510) per second, said number of pulses packets per second having a predefined value, said predefined value being correlated to the value assumed by a supply voltage of the radiofrequency generator (101) itself and/or being correlated to the value assumed by a supply voltage of the device, optionally said correlation being a negative correlation, in which the number of pulses packets per second emitted by the radiofrequency generator (101) decreases as the supply voltage increases.

According to a further non-limiting aspect, the peak or peak-to-peak amplitude of the second pulses train (104) is lower than the peak or peak-peak amplitude of the first pulses train (103).

According to a further non-limiting aspect, the peak or peak-to-peak amplitude of the third pulses train (105) is lower than the peak or peak-peak amplitude of the second pulses train (104).

According to a further non-limiting aspect, the peak or peak-to-peak amplitude of the fourth pulses train (106) is lower than the peak or peak-peak amplitude of the third pulses train (105).

According to a further non-limiting aspect, the peak or peak-to-peak amplitude of the fifth pulses train (107) is lower than the peak or peak-peak amplitude of the fourth pulses train (106).

According to a further non-limiting aspect, said radiofrequency generator (101), in said operating configuration, generates a sequence of pulses packets (510) separated from each other by a pause (120) with a length comprised between a first minimum value and a second maximum value.

According to a further non-limiting aspect, the pulses packet (510) has a predefined time length, or the sequence of pulses packets (510) comprises a plurality of packets with predefined length.

According to a further non-limiting aspect, said predefined time length is comprised between 150 μs and 200 μs.

According to a further non-limiting aspect, the first minimum value is ≥180 μs, preferably ≥200 μs, even more preferably ≥210 μs.

According to a further non-limiting aspect, the second maximum value is ≤3200 μs, preferably ≤3000 μs, even more preferably ≤2900 μs.

According to a further non-limiting aspect, the device comprises a stage for generating pseudorandom numbers, configured to generate a pseudorandom number at each emission of said pulses packet (510), said pseudorandom number being comprised between said first minimum value and said second maximum value and being attributed to the length of the pause (120).

According to a further non-limiting aspect, said signal is a current signal having a maximum peak-to-peak amplitude, less than 6 A, preferably lower than or equal to 5.7 A, even more preferably lower than or equal to 5.6 A.

According to a further non-limiting aspect, said electromagnetic field inductor element (102) comprises at least a "C"-shaped ferrite core, optionally a pair of "C"-shaped ferrite cores, oriented in an opposite way and juxtaposed each other.

According to a further non-limiting aspect, said electromagnetic field inductor element (102) comprises at least one ferrite core with an annular and/or toroidal shape, optionally in which said ferrite core with an annular and/or toroidal shape is configured to couple at an external surface of said recess of the tank.

According to a further non-limiting aspect, said electromagnetic field inductor element (102) comprises a continuous ferrite ring, identifying a circumference without interruptions.

According to a further non-limiting aspect, the coupling between the annular and/or toroidal-shaped ferrite core is configured to couple with said recess by means of a contrast insertion and/or by means of a mutual gluing.

According to a further non-limiting aspect, said C-shaped ferrite core and/or the pair of C-shaped ferrite cores is made with the following characteristics: magnetic induction 320 (mT), with H=250 Nm, f=25 kHz, and T=100° C. and/or with loss (W)≤40 with f=100 kHz, B=100 mT, T=100° C., preferably with loss (W) 32.

According to a further non-limiting aspect, said radiofrequency generator (101) comprises a plurality of transistors (206t) in push-pull configuration, optionally a first pair of transistors (206t) in push-pull configuration and a second pair of transistors (206t) in push-pull configuration, supplying respectively a first and a second terminal of said output (101o).

According to a further non-limiting aspect, said output (101o) comprises a shunt adapted to supply a magnetic induction feedback circuit (207, 208, 209).

According to a further non-limiting aspect, said magnetic induction feedback circuit (207, 208, 209) comprises a current or voltage rectifier (207), configured to be supplied at the input with an alternating voltage or current, and configured to produce, on a first and second output terminal, a direct current or voltage and comprises at least one signalling device (208), electrically connected between the first and the second output terminals and adapted to emit an alarm signal proportional to said induction, optionally an LED diode electrically connected between the first and the second output terminals and adapted in use to light up with an intensity of radiation proportional to said induction.

According to a further non-limiting aspect, the device comprises a data processing unit (200), configured to supply said radiofrequency generator (101) with a control signal for generating said pulses packet.

According to a further non-limiting aspect, said device comprises a cable for supplying said signal to said radiofrequency generator (101), said cable being electrically connected to the output (101o) of said radiofrequency generator (101), optionally to the first and to the second output terminals of said radiofrequency generator (101).

According to a further non-limiting aspect, said device is a device adapted to, and/or specifically intended for, and/or configured to carry out a decontamination from substantially solid residues, in particular limescale ones, and/or of calcium calcites or carbonates, and/or from oxides, in particular of ferrous materials and even more in particular of iron, dissolved or otherwise suspended in the liquid, and/or a disinfection or significant and/or substantial removal of bacteria from said liquid, in particular of at least one type of bacterium and more in particular at least of the bacterium of the genus *Legionella* and/or *pseudomonas*.

System

According to a further aspect, a system is realised comprising a device for treating fluids according to one or more of the present aspects, and a portion of duct (400), adapted to be positioned in a predetermined position with respect to said electromagnetic field inductor element (102).

According to a further non-limiting aspect, the portion of the duct (400) is made at least partially of plastic material.

According to a further non-limiting aspect, the positioning relationship between the duct portion (400) and the device is such that, in use, the predetermined position is fixed.

According to a further non-limiting aspect, a system is realised comprising a device for treating fluids according to one or more of the present aspects, and a tank (200) for liquids, provided with a recess (201), in particular an outwardly convex recess, at which, in particular around which, said electromagnetic field inductor element (102) is positioned.

Method

According to one aspect, a method for treating fluids (100) is realised, comprising:
the coupling between at least one electromagnetic field inductor element (102) made of magnetically permeable material and a duct (400) and/or tank (200) for fluids, in such a way that said coupling occurs through a predefined positional relationship, the generation of a radiofrequency signal comprising at least one pulses packet (510) in turn comprising at least a first pulses train (103) and a second pulses train (104); said first pulses train (103) having a first predefined frequency (f1), said second pulses train (104) having a second predefined frequency (f2); said first predefined frequency (f1) being distinct from the second predefined frequency (f2);

the supply, through the output (101o) of a radiofrequency generator (101), of the radiofrequency signal in said electromagnetic field inductor (102).

According to a further non-limiting aspect, the first pulses train (103) is obtained by generating a plurality of pulses, each of which assumes said first predefined frequency (f1).

According to a further non-limiting aspect, the second pulses train (104) is obtained by generating a plurality of pulses, each of which assumes said second predefined frequency (f2).

According to a further non-limiting aspect, the generation of a radiofrequency signal comprises the generation of a square wave signal, and/or the pulses of the at least the first pulses train (103) and/or of the at least the second pulses train (104) are square wave pulses.

According to a further non-limiting aspect, in at least one of said first and second pulses trains (103, 104), the pulses of the respective pulses train (103, 104) follow one another seamlessly.

According to a further non-limiting aspect, the coupling is such that the electromagnetic field inductor (102) and said duct (400) or tank (200) occurs through a positioning at a predetermined distance.

According to a further non-limiting aspect, said first pulses train (103) has a frequency lower than the frequency of said second pulses train (104), and/or the first predefined frequency (f1) is lower than the second predefined frequency (f2).

According to a further non-limiting aspect, the generation of said radiofrequency signal comprises introducing in the pulses packet (510) the first pulses train (103) and the second pulses train (104) according to a predefined time sequence.

According to a further non-limiting aspect, the generation of said radiofrequency signal comprises introducing in the pulses packet (510) the first pulses train (103) and the second pulses train (104) according to a random and/or pseudorandom time sequence.

According to a further non-limiting aspect, the predefined time sequence is such that the first pulses train (103) temporally precedes the second pulses train (104).

According to a further non-limiting aspect, the coupling of said at least one electromagnetic field inductor element (102) is such that said duct (400) is at least partially enclosed within said electromagnetic field inductor element and/or is such whereby said electromagnetic field inductor (102) is positioned at at least one recess (201) of said tank, said recess being outwardly convex.

According to a further non-limiting aspect, the first pulses train (103) has a first maximum amplitude and said second pulses train (104) has a second maximum amplitude distinct from the first maximum amplitude.

According to a further non-limiting aspect, the second maximum amplitude is lower than the first maximum amplitude.

According to a further non-limiting aspect, the method comprises a generation step, optionally of generation and subsequent supply, of a plurality of pulses trains each having its own predefined frequency and its own predefined amplitude, and in which, having observed two pulses trains in the same packet (110), the second and subsequent pulses train has a higher frequency and a lower amplitude than the frequency and amplitude of the first and previous pulses train.

According to a further non-limiting aspect, the first pulses train (103) comprises a plurality of pulses, preferably lower than 10 and even more preferably lower than 6, wherein at least two pulses of said first pulses train (103), preferably all the pulses of said first pulses train (103) have a substantially equal peak and/or peak-to-peak amplitude.

According to a further non-limiting aspect, the second pulses train (104) comprises a plurality of pulses, preferably lower than 10 and even more preferably lower than 6, wherein at least two pulses of said second pulses train (104), preferably all the pulses of said second pulses train (104), have a substantially equal peak and/or peak-to-peak amplitude.

According to a further non-limiting aspect, the method comprises supplying said electromagnetic field inductor (102) with a pulses packet (510) comprising pulses having a frequency comprised between 30 kHz and 270 kHz, more preferably comprised between 40 kHz and 260 kHz, even more preferably comprised between 50 kHz and 250 kHz.

According to a further non-limiting aspect, the pulses packet (510) comprises a third pulses train (105), a fourth pulses train (106) and a fifth pulses train (107) placed in time sequence to said second pulses train (104).

According to a further non-limiting aspect, in at least one of said third, fourth and fifth pulses trains (105, 106, 107), the pulses of the respective pulses train (105, 106, 107) follow one another seamlessly.

According to a further non-limiting aspect, the first pulses train (103), the second pulses train (104), the third pulses train (105), the fourth pulses train (106) and the fifth pulses train (107) are placed in a time sequence in said pulses packet (510) in accordance with a predefined order.

According to a further non-limiting aspect, the first pulses train (103), the second pulses train (104), the third pulses train (105), the fourth pulses train (106) and the fifth pulses train (107) are placed in a time sequence in said pulses packet (510) in accordance with a random and/or pseudo-random order.

According to a further non-limiting aspect, the method comprises defining through a data processing unit (200) an order for said first pulses train (103) and for said second pulses train (104), optionally for the first pulses train (103), the second pulses train (104), the third pulses train (105), the fourth pulses train (106) and the fifth pulses train (107).

According to a further non-limiting aspect, said random and/or pseudorandom order is an order generated and/or defined through a data processing unit (200).

According to a further non-limiting aspect, the third pulses train (105) has a third predefined frequency (f3), the fourth pulses train (106) has a fourth predefined frequency (f4), and the fifth pulses train (107) has a predefined fifth frequency (f5).

According to a further non-limiting aspect, the third predefined frequency (f3) is greater than the second predefined frequency (f2).

According to a further non-limiting aspect, the fourth predefined frequency (f4) is greater than the third predefined frequency (f3).

According to a further non-limiting aspect, the fifth predefined frequency (f5) is greater than the fourth predefined frequency (f4).

According to a further non-limiting aspect, each pulses train between said at least a first pulses train (103) and a second pulses train (104), optionally between the first, the second, the third, the fourth and the fifth pulses train (103, 104, 105, 106, 107) has a characteristic pair [peak amplitude (130)-frequency], wherein as the frequency increases, the peak amplitude is reduced and/or wherein the peak amplitude (130) varies with law inversely proportional to the frequency.

According to a further non-limiting aspect, the generation of said radiofrequency signal comprising at least one pulses packet (510) comprises the generation of at least a first pulses train (103) with a frequency comprised between 80 kHz and 100 kHz, optionally a first pulses train (103) with a frequency substantially equal to 90 kHz.

According to a further non-limiting aspect, the first pulses train (103) comprises 5 pulses.

According to a further non-limiting aspect, the generation of said radiofrequency signal comprising at least one pulses packet (510) comprises the generation of at least a second pulses train (104) with a frequency comprised between 100 kHz and 130 kHz, optionally a second pulses train (104) with a frequency substantially equal to 111 kHz.

According to a further non-limiting aspect, the second pulses train (104) comprises 5 pulses.

According to a further non-limiting aspect, the generation of said radiofrequency signal comprising at least one pulses packet (510) comprises the generation of at least a third pulses train (105) with a frequency comprised between 130 kHz and 160 kHz, optionally a third pulses train (105) with a frequency substantially equal to 143 kHz.

According to a further non-limiting aspect, the third pulses train (105) comprises 5 pulses.

According to a further non-limiting aspect, the generation of said radiofrequency signal comprising at least one pulses packet (510) comprises the generation of at least a fourth pulses train (106) with a frequency comprised between 160 kHz and 250 kHz, optionally a fourth pulses train (106) with a frequency substantially equal to 200 kHz.

According to a further non-limiting aspect, the fourth pulses train (106) comprises 5 pulses.

According to a further non-limiting aspect, the generation of said radiofrequency signal comprising at least one pulses packet (510) comprises the generation of at least a predefined number of pulses packets (510) per second.

According to a further non-limiting aspect, the generation of said radiofrequency signal comprising at least one pulses packet (510) comprises the generation of at least a number of pulses packets (510) comprised between 1450 and 1650 packets per second, optionally a number equal to 1550 packets per second, and/or is configured to generate a number of pulses packets (510) comprised between 600 and 750 packets per second, optionally a number equal to 675 packets per second, and/or is configured to generate a number of pulses packets (510) comprised between 500 and 650 packets per second, optionally a number equal to 574 packets per second, and/or is configured to generate a number of pulses packets (510) comprised between 250 and 350 packets per second, optionally a number equal to 306 packets per second, and/or is configured to generate a number of pulses packets (510) substantially comprised between 6000 and 7000 packets per second.

According to a further non-limiting aspect, the generation of said radiofrequency signal comprising at least one pulses packet (510) comprises the generation of at least a number of pulses packets (510) substantially comprised between 6000 and 7000 packets per second, each comprising a pulses train with a frequency comprised between 40 kHz and 400 kHz, more preferably comprised between 45 kHz and 350 kHz.

According to a further non-limiting aspect, the generation of said radiofrequency signal comprising at least one pulses packet (510) comprises the generation of at least a number of pulses packets (510) per second, said number of pulses packets per second having a predefined value, said predefined value being correlated to the value assumed by a supply voltage of the radiofrequency generator (101) itself and/or being correlated to the value assumed by a supply voltage of the device, optionally said correlation being a negative correlation, in which the number of pulses packets per second emitted by the radiofrequency generator (101) decreases as the supply voltage increases.

According to a further non-limiting aspect, the generation of said radiofrequency signal comprises the generation of a radiofrequency signal having a substantially null average value.

According to a further non-limiting aspect, the peak or peak-to-peak amplitude of the second pulses train (104) is lower than the peak or peak-peak amplitude of the first pulses train (103).

According to a further non-limiting aspect, the peak or peak-to-peak amplitude of the third pulses train (105) is lower than the peak or peak-peak amplitude of the second pulses train (104).

According to a further non-limiting aspect, the peak or peak-to-peak amplitude of the fourth pulses train (106) is lower than the peak or peak-peak amplitude of the third pulses train (105).

According to a further non-limiting aspect, the peak or peak-to-peak amplitude of the fifth pulses train (107) is lower than the peak or peak-peak amplitude of the fourth pulses train (106).

According to a further non-limiting aspect, the method comprises a generation, through said radiofrequency generator (101), and/or said supply, of a sequence of pulses packets (110) separated from each other by a pause (120) with a length comprised between a first minimum value and a second maximum value.

According to a further non-limiting aspect, the pulses packet (510) has a predefined time length, or the sequence of pulses packets (110) comprises a plurality of packets with predefined length.

According to a further non-limiting aspect, said predefined time length is comprised between 150 μs and 200 μs.

According to a further non-limiting aspect, the first minimum value is ≥180 μs, preferably ≥200 μs, even more preferably ≥210 μs.

According to a further non-limiting aspect, the second maximum value is ≤3200 μs, preferably ≤3000 μs, even more preferably ≤2900 μs.

According to a further non-limiting aspect, the method comprises a step of automatic generation of pseudorandom numbers, optionally by means of a data processing unit (200), at each supply of said pulses packet (510), said pseudorandom number being comprised between said first minimum value and said second maximum value and being electronically attributed to the length of the pause (120).

According to a further non-limiting aspect, the method comprises a step of stopping the supply of said signal at the end of said pulses packet (510) and a resumption of the supply of a new pulses packet (510) to said electromagnetic field inductor (102) after a time corresponding to the length of the pause (120).

According to a further non-limiting aspect, the supply of a radiofrequency signal in said electromagnetic field inductor (102), through the output (101o) of a radiofrequency generator (101), comprises the transmission of the radiofrequency signal through a metallic conductor electrically connected to a first and a second terminal of the output (101o) of said radiofrequency generator (101) and at least partially wound in a predetermined point of said electromagnetic field inductor (102).

According to a further non-limiting aspect, the method comprises a step of positioning said electromagnetic field inductor (102) at at least part of a non-metallic duct (400), so that at least a part of the magnetic flux generated by means of the electromagnetic field inductor (102) floods and/or runs through said duct (400) in a direction at least partially orthogonal with respect to the direction of maximum extension of said duct and/or to the direction of flow in use of the fluid inside said duct.

According to a further non-limiting aspect, the method comprises a step of positioning said electromagnetic field inductor (102) at at least part of a tank (200), in particular of said outwardly convex recess (201), in such a way that the area of tank (200) and/or of said recess (201) enclosed by said electromagnetic field inductor (102) is likely to comprise, in use, some liquid contained in said tank (200) and/or in said recess (201).

According to a further non-limiting aspect, said electromagnetic field inductor element (102) comprises at least a "C"-shaped ferrite core, optionally a pair of "C"-shaped ferrite cores, oriented in an opposite way and juxtaposed each other, and the positioning of said electromagnetic field inductor (102) is such that the duct (400) and/or said recess (201), is with regards to a portion thereof substantially inside the concavity delineated by said "C" and/or inside the cavity made by said pair of "C"-shaped ferrite cores.

According to a further non-limiting aspect, the method comprises installing a shunt on the output (101o) of said radiofrequency generator (101), and also comprises supplying a magnetic induction feedback circuit (207, 208, 209) by means of a signal taken from said shunt.

According to a further non-limiting aspect, the method comprises a step of supplying at least one signalling device (208) of said circuit (207, 208, 209), optionally an LED diode, in such a way as to cause it to light up with an intensity of radiation proportional to said induction.

According to a further non-limiting aspect, said treatment method is a decontamination and/or disinfection method.

According to a further non-limiting aspect, said fluids comprise waters for domestic use and/or drinkable waters.

Use

According to a further aspect, the use of the device according to one or more of the preceding aspects for limescale reduction and/or rust reduction and/or removal of bacteria in the duct (400) and/or in said tank (200), in particular in the liquid flowing in said duct (400) and/or in the liquid present in said tank (200) is described.

According to a further aspect, the implementation of the method according to one or more of the preceding aspects for limescale reduction, and/or rust reduction and/or removal of bacteria in the duct (400) and/or in said tank (200), in particular in the liquid flowing in said duct (400) and/or in the liquid present in said tank (200) is described.

According to a further non-limiting aspect, the implementation of the method according to one or more of the preceding aspects for the elimination of *Legionella*, in particular of *Legionella pneumophila* and/or *Pseudomonas*, is described.

Computer program According to one aspect, a computer program is realised, stored on a non-transient storage medium and configured to be executed by at least one electronic computer, said computer program comprising portions of software code which, when executed, cause the automatic execution of the following steps:

activation of a radiofrequency generator (101) configured to generate a radiofrequency signal;

the generation of a radiofrequency signal which comprises at least one pulses packet (510) in turn comprising at least a first pulses train (103) and a second pulses train (104); said first pulses train (103) having a first predefined frequency (f1), said second pulses train (104) having a second predefined frequency (f2); said first predefined frequency (f1) being distinct from the second predefined frequency (f2);

the supply, through the output (101o) of a radiofrequency generator (101), of said radiofrequency signal in an electromagnetic field inductor (102).

According to a further non-limiting aspect, each of the pulses of the first pulses train (103) has, as its own frequency, said first predefined frequency (f1) and each of the pulses of the second pulses train (104) has, as its own frequency, said second predefined frequency (f2).

According to a further non-limiting aspect, said first pulses train (103) has a frequency lower than the frequency of said second pulses train (104), and/or the first predefined frequency (f1) is lower than the second predefined frequency (f2).

According to a further non-limiting aspect, the first pulses train (103) has a first maximum amplitude and said second pulses train (104) has a second maximum amplitude distinct from the first maximum amplitude.

According to a further non-limiting aspect, the second maximum amplitude is lower than the first maximum amplitude.

According to a further non-limiting aspect, the computer program comprises portions of software code which, when executed, cause the generation, optionally of generation and subsequent supply, of a plurality of pulses trains each having its own predefined frequency and its own predefined amplitude, and in which, having observed two subsequent pulses trains in the same packet (510), the second and subsequent pulses train has a greater frequency and a lower amplitude than the frequency and amplitude of the first and preceding pulses train.

According to a further non-limiting aspect, the generation of said radiofrequency signal takes place in such a way that, in the pulses packet (510), the first pulses train (103) and the second pulses train (104) are introduced according to a predefined time sequence.

According to a further non-limiting aspect, the generation of said radiofrequency signal takes place in such a way that, in the pulses packet (510), the first pulses train (103) and the second pulses train (104) are introduced according to a random and/or pseudorandom time sequence.

According to a further non-limiting aspect, the predefined time sequence is such that the first pulses train (103) temporally precedes the second pulses train (104).

According to a further non-limiting aspect, the first pulses train (103) comprises a plurality of pulses, preferably lower than 10 and even more preferably lower than 6, wherein at least two pulses of said first pulses train (103), preferably all the pulses of said first pulses train (103) have a substantially equal peak and/or peak-to-peak amplitude.

According to a further non-limiting aspect, the second pulses train (104) comprises a plurality of pulses, preferably lower than 10 and even more preferably lower than 6, wherein at least two pulses of said second pulses train (104), preferably all the pulses of said second pulses train (104), have a substantially equal peak and/or peak-to-peak amplitude.

According to a further non-limiting aspect, the computer program comprises portions of software code which, when executed, cause a step of supplying said electromagnetic field inductor (102) with a pulses packet (510) comprising pulses having a frequency less than 500 kHz, comprised between 30 kHz and 270 kHz, more preferably comprised between 40 kHz and 260 kHz, even more preferably comprised between 50 kHz and 250 kHz.

According to a further non-limiting aspect, the pulses packet (510) comprises a third pulses train (105), a fourth pulses train (106) and a fifth pulses train (107) placed in time sequence to said second pulses train (104).

According to a further non-limiting aspect, the third pulses train (105) has a third predefined frequency (f3), the fourth pulses train (106) has a fourth predefined frequency (f4), and the fifth pulses train (107) has a predefined fifth frequency (f5).

According to a further non-limiting aspect, the first pulses train (103), the second pulses train (104), the third pulses train (105), the fourth pulses train (106) and the fifth pulses train (107) are placed in a time sequence in said pulses packet (510) in accordance with a predefined order.

According to a further non-limiting aspect, the first pulses train (103), the second pulses train (104), the third pulses train (105), the fourth pulses train (106) and the fifth pulses train (107) are placed in a time sequence in said pulses packet (510) in accordance with a random and/or pseudo-random order.

According to a further non-limiting aspect, the third predefined frequency (f3) is greater than the second predefined frequency (f2).

According to a further non-limiting aspect, the fourth predefined frequency (f4) is greater than the third predefined frequency (f3).

According to a further non-limiting aspect, the fifth predefined frequency (f5) is greater than the fourth predefined frequency (f4).

According to a further non-limiting aspect, each pulses train between said at least a first pulses train (103) and a second pulses train (104), optionally between the first, the second, the third, the fourth and the fifth pulses train (103, 104, 105, 106, 107) has a characteristic pair [peak amplitude (130)-frequency], wherein as the frequency increases, the peak amplitude is reduced and/or wherein the peak amplitude (130) varies with law inversely proportional to the frequency.

According to a further non-limiting aspect, the peak or peak-to-peak amplitude of the second pulses train (104) is lower than the peak or peak-peak amplitude of the first pulses train (103).

According to a further non-limiting aspect, the peak or peak-to-peak amplitude of the third pulses train (105) is lower than the peak or peak-peak amplitude of the second pulses train (104).

According to a further non-limiting aspect, the peak or peak-to-peak amplitude of the fourth pulses train (106) is lower than the peak or peak-peak amplitude of the third pulses train (105).

According to a further non-limiting aspect, the peak or peak-to-peak amplitude of the fifth pulses train (107) is lower than the peak or peak-peak amplitude of the fourth pulses train (106).

According to a further non-limiting aspect, the computer program is configured to cause a generation through said radiofrequency generator (101), and/or said supply of a sequence of pulses packets (510) separated from each other by a pause (120) with a length comprised between a first minimum value and a second maximum value.

According to a further non-limiting aspect, the pulses packet (510) has a predefined time length, or the sequence of pulses packets (110) comprises a plurality of packets with predefined length.

According to a further non-limiting aspect, said predefined time length is comprised between 150 μs and 200 μs.

According to a further non-limiting aspect, the first minimum value is ≥180 μs, preferably ≥200 μs, even more preferably ≥210 μs.

According to a further non-limiting aspect, the second maximum value is ≤3200 μs, preferably ≤3000 μs, even more preferably ≤2900 μs.

According to a further non-limiting aspect, the computer program comprises portions of software code which, when executed, cause the automatic activation of a generator of pseudorandom numbers, optionally by means of a data processing unit (200), said automatic activation being performed at each supply of said pulses packet (510), said pseudorandom number being comprised between said first minimum value and said second maximum value and being electronically attributed to the length of the pause (120).

According to a further non-limiting aspect, the computer program comprises portions of software code which, when executed, cause the execution of a step of stopping the supply of said signal at the end of said pulses packet (510) and a resumption of the supply of said electromagnetic field inductor element (102) with a new pulses packet (510) after a time corresponding to the length of the pause (120).

According to a further non-limiting aspect, the supply, through the output (101o) of a radiofrequency generator (101), of a radiofrequency signal in said electromagnetic field inductor (102), comprises the transmission of the radiofrequency signal through a metallic conductor electrically connected to a first and a second terminal of the output (101o) of said radiofrequency generator (101) and at least partially wound in a predetermined point of said electromagnetic field inductor (102).

According to a further non-limiting aspect, the computer program comprises portions of software code which, when executed, cause the supply of a magnetic induction feedback circuit (207, 208, 209) in such a way that it can generate an alarm signal, optionally a light radiation, proportional to said induction.

According to a further non-limiting aspect, the computer program comprises portions of software code which, when executed, cause the execution of an electronic analysis of a return induction feedback signal from said electromagnetic field inductor (102), a comparison of said feedback signal with a predetermined threshold, and a subsequent activation of an alarm signal if said feedback signal is higher than said predetermined threshold.

Machine for Distributing Beverages

According to a further aspect, a machine for distributing beverages (300) is described, comprising a tank (200), configured to contain in use a liquid for distributing beverages, and comprising a dispenser (205) configured to allow the beverage comprising said liquid to be dispensed and configured to removably accommodate a capsule for distributing beverages and/or for mixing or dosing and/or filtering powdered or granular products for making said beverage; said machine comprising a device for treating fluids (100) according to one or more of the preceding aspects.

According to a further non-limiting aspect, said tank (200) has an outwardly convex recess (201), at which an electromagnetic field inductor (102) is installed in a predetermined positional relationship.

According to a further non-limiting aspect, said recess (201) is positioned in a position lower than said tank (200), typically in such a way as to be filled by the liquid contained in said tank (200), so that said electromagnetic field inductor (102) can diffuse an electromagnetic field in the portion of liquid contained in said recess (201) and consequently, seamlessly, in the liquid contained in said tank (200).

According to a further non-limiting aspect, said machine (300) comprises a first and a second electromagnetic field inductor (102); said first electromagnetic field inductor (102) being positioned in a portion of duct, in particular of a delivery duct (207) upstream with respect to said tank (200); said second electromagnetic field inductor (102) being positioned downstream with respect to said tank (200), in particular in a predefined positional relationship on a delivery duct placed between said tank (200) and the dispenser (205).

Further details and aspects will be made clear in the following detailed description of the object of the present disclosure, with reference to the attached figures.

BRIEF DESCRIPTION OF THE DRAWINGS

The object of the present disclosure will now be described in one or more preferred and non-limiting embodiments with reference to the attached figures, in which.

DETAILED DESCRIPTION

Figure 1:
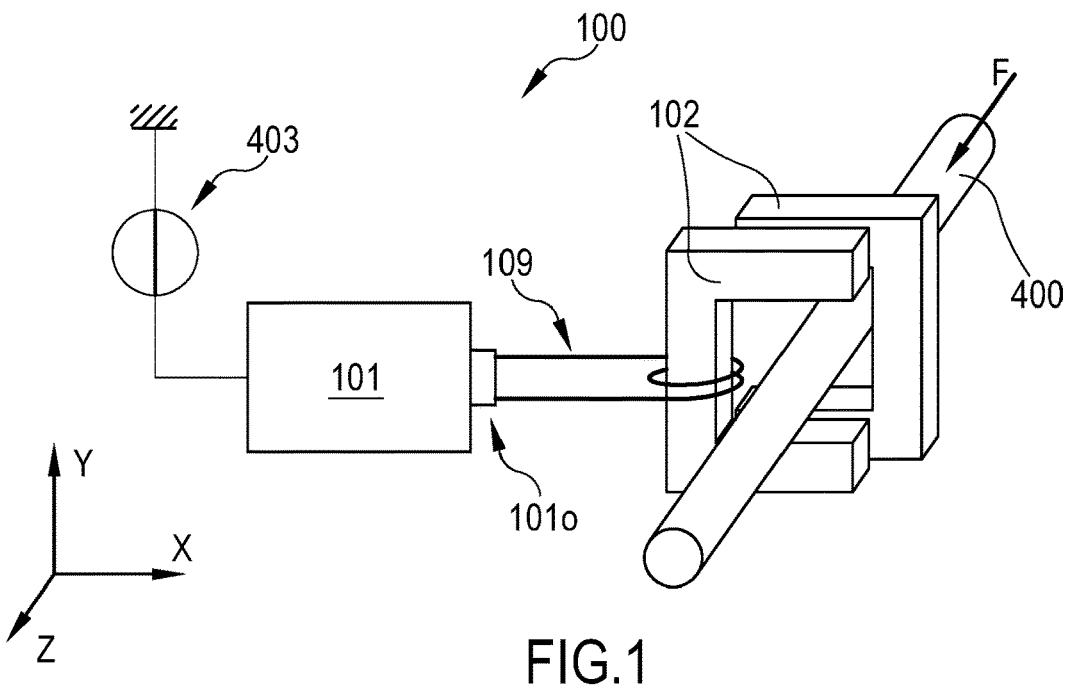
FIG. 1 illustrates a basic diagram of a device for treating fluids.

With reference to FIG. 1, the reference number 100 indicates as a whole a device for treating fluids, in particular, but not limitedly, conceived for treating waters intended for domestic use and/or drinking waters.

According to the present disclosure, "treatment" means a process of decontamination from substantially solid residues, in particular limescale ones, and/or of calcites or calcium carbonates, and/or from oxides, in particular of ferrous materials and even more in particular of iron, dissolved or otherwise suspended in the liquid, and/or a disinfection or significant and/or substantial removal of bacteria from said liquid, in particular of at least one type of bacterium and more in particular at least of the bacterium of the genus *Legionella* and/or *pseudomonas*. This definition of "treatment" implies a treatment through electromagnetic waves, in turn comprising a magnetic field and/or electric field. One of the two field components can be significantly lower than the other or substantially absent. The Applicant has observed that the treatment of the waters in order to eliminate or substantially remove the bacteria from the same, can be advantageously carried out using signals generically comprised in the radio frequency domain.

The device 100 first of all comprises a radiofrequency generator, indicated with the reference number 101, and at least one electromagnetic field inductor element 102, which is adapted to be installed in a predefined positional relationship with respect to a duct 400 where the fluids flow. When the electromagnetic field inductor elements 102 are two or more, the latter can be supplied independently (i.e. through two distinct outputs, potentially with different signals) or synchronously (i.e., by signals with the same characterization). In FIG. 1, the flow direction of the fluid is schematically indicated by the arrow F. Preferably, but not limitedly, the positional relationship is a fixed position.

The radiofrequency generator 101, which is supplied by an electrical supply source schematically represented with the reference number 403, comprises an output 101o having a first and a second terminal to which a cable 109 of electrically conductive material is connected, for example and not limitedly copper or any other metallic material, which is at least partially wound in a portion of the electromagnetic field inductor element 102 in order to cause the induction of the frequency signal in the electromagnetic field inductor element 102 itself; the latter in use causes the induction of an electromagnetic field inside the duct 400, in particular at least at the portion of the duct which is substantially at the electromagnetic field inductor element 102 and which, preferably although not limitedly, is installed in such a way as to result in a predetermined and fixed position with respect to the electromagnetic field inductor 102, in particular resulting preferably not in contact therewith.

In a preferred embodiment, illustrated in FIG. 1, the electromagnetic field inductor element comprises a first and a second ferrite core, each of which is in the shape of a "C". The first and the second ferrite cores are arranged in such a way as to have the "C" oriented on a plane parallel to a first reference axis X and to a second reference axis Y. More in particular, the first and the second ferrite cores are oriented in an opposite way, so that, when observed along a direction parallel to a third reference axis Z orthogonal both to the first reference axis X and to the second reference axis Y, the first ferrite core has a straight "C"-shaped section, and the second ferrite core has a reversed "C"-shaped section, in particular rotated by 180°. The first and the second ferrite cores are substantially juxtaposed along a direction parallel to the third reference axis Z. In FIG. 1 the two cores, for clarity's sake of representation, are represented slightly offset along a direction parallel to the first reference axis X, although in substantial juxtaposition along the direction identified by the third reference axis Z. The duct 400 is thus oriented along the third reference axis Z, in a direction which is substantially orthogonal with respect to the plane on which the "C" develops. Although in FIG. 1 the two cores are represented with sharp edges, this characteristic is not limiting, since the two cores, in the context of keeping the "C" shape or any other shape, could have rounded profile and/or edges.

The use of two "C"-shaped ferrite cores allows for an easy installation on the duct 400, first by positioning a first core so that the duct is within the cavity of the C, and then by installing the second core so as to orient it in a direction reversed with respect to the first one, effectively constraining the duct 400 within a closed cavity formed by the first and the second core. The first and the second ferrite cores can be respectively held in the correct and reciprocal position by means of a strap or equivalent removable fixing device.

Particular effectiveness was found in the use of ferrite with the following characteristics:

(type 1) B≥320 mT with H=250 A/m, f=25 kHz and T=100° C., and loss ≤35 W with f=25 kHz B=200 nT, T=100° C., and 40 W with f=100 kHz B=100 mT, T=100° C.

(type 2) B≥320 mT with H=250 A/m, f=25 kHz and T=100° C., and loss ≤32 W with f=100 kHz B=100 mT, T=100° C.

In a particular embodiment, the electromagnetic field inductor 102 is a continuous type ring, identifying a circumference without interruption points. Thanks to this aspect, a remarkable uniformity of electromagnetic field induction has been experimentally demonstrated.

Figure 2:
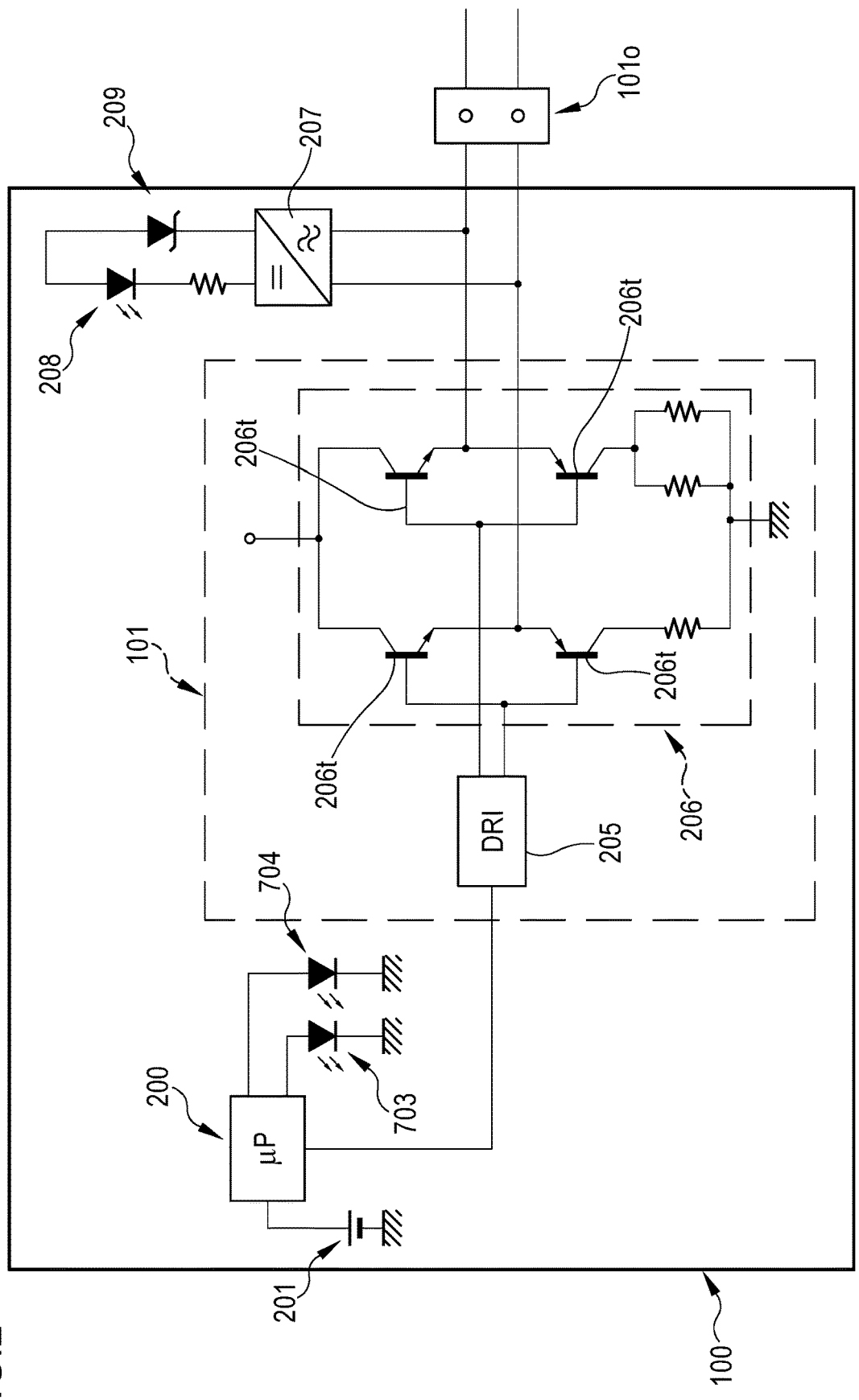
FIG. 2 illustrates a circuit diagram of the device for treating fluids according to the present disclosure.

FIG. 2 illustrates a more detailed diagram for device 100. In particular, it can be observed that the radiofrequency generator 101 comprises a driver module 205 and a power stage 206 supplied at the input by the driver module 205; the power stage is configured to generate a radiofrequency signal whose characteristics will be better described in the following description portion, and which in particular comprises pulses trains. For this reason, the power stage 206 conveniently comprises a pair of branches comprising transistors 206t in a push-pull configuration; each branch receives at its input a driving signal from the driver module 205 and has at its output, interposed between the two transistors 206t, which supplies a terminal of the output 101o. In a non-limiting embodiment, each of the transistors 206t of each of the branches of the power stage is a transistor in a Darlington configuration, for example with bipolar junction. This solution allows to have high output currents, and therefore guarantees the transfer of a high power signal on the ferrite cores.

Across the output 101o there is also a shunt towards an electromagnetic induction feedback circuit, which first of all comprises an alternating current to direct current converter, or rectifier 207, obtained for example as a diode bridge, having a first and a second input terminal connected respectively to the first and second terminal of the output 101o, and a first and a second output terminal between which a series formed by a Zener diode 209, and by a signalling device 208, which in the specific form embodiment shown in FIG. 2 is an LED diode, is connected. The electromagnetic induction feedback circuit is configured in such a way as to cause an illumination of the LED diode which is increasing and/or proportional with the level of induction in the ferrite cores. If the LED diode is generically replaced by a signalling device 208, the alarm signal generated by the signalling device 208 will be proportional to the aforementioned induction in the ferrite cores. Thanks to this aspect, the user can have immediate feedback on the operation of the device. If the signalling device is of the acoustic type, the electromagnetic induction feedback circuit can advantageously be configured to activate the acoustic signalling device only when the induction signal exceeds, for example decreases below, a certain threshold.

The circuit of the device 100 also comprises a microprocessor 200, or data processing unit, which can be a microcontroller of the general purpose type suitably programmed, or alternatively be a dedicated microprocessor or yet an FPGA, preferably of the type equipped with an internal memory. The microprocessor 200 is configured to supply the input of the driver stage 205 with a suitable control signal to cause the transmission of the frequency signal towards the ferrite cores, and is also configured to be able to store a plurality of numerical values identifying a plurality of pulse emission frequencies in said frequency signal, of voltage and/or current amplitudes to supply the frequency signal, and also to store a plurality of time duration values, for example of each pulse or pulses train, or pauses between pulses, in the manner described in greater detail in the following description portion. Preferably, although not limitedly, these numerical values are stored in a non-volatile storage medium.

The microprocessor 200 also controls a first LED diode 703 in such a way as to cause the supply thereof when the supply voltage from the supply source 201, and a second LED diode 704, in such a way as to cause the supply thereof when there is a malfunction. Clearly, the presence of the first and second LED diodes 703, 704 is not to be considered as limiting or mandatory.

It has already been said that the device 100 is configured to transmit a frequency signal, in particular a signal in the radiofrequency domain and for this reason defined as a "radiofrequency signal", to the ferrite cores. More precisely, the signal transmitted to the ferrite cores is a signal that comprises pulses having a frequency less than 500 kHz, and preferably comprised between 30 kHz and 270 kHz, more preferably comprised between 40 kHz and 260 kHz, even more preferably comprised between 50 kHz and 250 kHz. The use of pulse signals with a frequency comprised in the aforementioned values advantageously allows to optimize the reduction of limescale, rust and bacteria, in particular *Legionella* (particularly, *Pneumophila*) and/or *Pseudomonas*, in the fluid downstream of the transit at the ferrite cores. In particular, the Applicant has found that pulses between 30 kHz and 100 kHz, and in particular between 50 kHz and 90 kHz, are effective in eliminating limescale in the fluid downstream of the transit at the ferrite cores; pulses between 120 kHz and 230 kHz, and in particular between 130 kHz and 220 kHz, are instead effective in eliminating rust. Pulses comprised between 240 kHz and 260 kHz have been observed to be particularly effective in eliminating *Legionella* in the fluid downstream of the transit at the ferrite cores. The use of signals in the aforementioned frequency ranges is little expensive in terms of circuit design, as a variety of manufacturers of electronic components that can operate at frequencies in the hundreds of kHz are available.

The radiofrequency signal transmitted by means of the radiofrequency generator 101 is a signal which comprises a pulses packet, and in particular comprises at least a first pulses train 103 and a second pulses train 104. In particular, the at least one first pulses train 103 and the second pulses train 104 are preferably placed in a predefined time sequence, and/or are placed in a predefined order. In particular, the order—established by the data processing unit, is such that the second pulses train 104 temporally follows the first pulses train 103. This does not waive that further configurations can be realised, in which the order of the first pulses train 103 and of the second pulses train 104, and more generally of all the pulses trains forming part of the pulses packet, can be random and/or pseudorandom; in this case the data processing unit processes this random and/or pseudorandom order.

Returning to the predefined order, the first pulses train 103 is characterized by its own first predefined frequency f1, and the second pulses train 104 is characterized by a second predefined frequency f2, distinct from the first frequency.

In a non-limiting embodiment, this means that each of the pulses of the first pulses train 103 and/or each of the pulses of the second pulses train 104 has its own predefined first (or second) frequency.

Preferably, although not limitingly, the pulses of the first pulses train 103 and the pulses of the second pulses train 104 follow one another seamlessly, i.e. there are no pauses between one pulse and the other.

The use of several pulses trains at different frequencies allows the device 100 to work in such a way as to eliminate limescale, rust and bacteria in a particularly effective way. Preferably the second predefined frequency f2 is greater than the first predefined frequency f1, and/or preferably, but not limitedly, the peak, or peak-to-peak amplitude of the second pulses train 104 is lower than the peak, or peak-to-peak amplitude, of the first pulses train 103. In general, the i-th pulses train is defined by a pair [frequency, amplitude], fixed for all the pulses of a respective train, and such that as the frequency increases the amplitude decreases. Each pulses train comprises a predefined number of pulses, preferably lower than 10, even more preferably lower than 6, in which at least two and preferably all the pulses of each train have equal peak or peak-to-peak amplitude.

The first predefined frequency f1 and the second predefined frequency f2 are basically selected in the following ranges: [40-60] kHz, preferably 50 kHz, [80-100] kHz, preferably 90 kHz, [120-140] kHz, preferably 130 kHz, [210-230] kHz, preferably 220 kHz, [240-260] kHz, preferably 250 kHz.

Conveniently, the radiofrequency signal is a substantially null average signal; "substantially" means that the signal is, in an ideal circuit free of noise or unwanted voltage or current bias, with an average equal to zero. This allows to reduce the electric current absorption by the device object of the present disclosure; the device is therefore economical when made operational. Furthermore, the presence of substantially null bias also allows to contain the dimensions of the supply circuit.

The second pulses train 104 is seamlessly transmitted immediately after the first pulses train 103.

Figure 3:
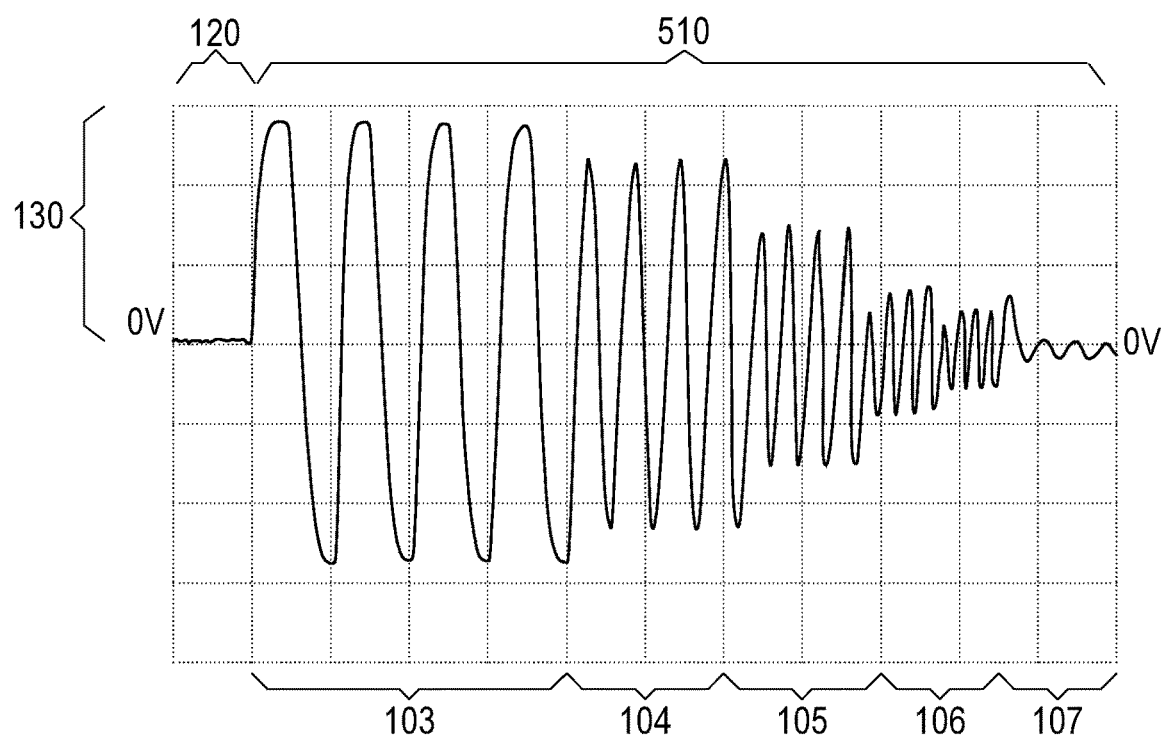
FIG. 3 illustrates a non-limiting example of a waveform of a radiofrequency signal emitted by a radiofrequency generator of said device.

FIG. 3 shows a preferred example of a pulses packet, which comprises 5 consecutive pulses trains, of which a first pulses train 103 has a frequency f1 equal to 50 kHz, a second pulses train 104 has a frequency f2 equal to 90 kHz, a third pulses train 105 has a frequency of 130 kHz, a fourth pulses train 106 has a frequency of 220 kHz, and a fifth pulses train has a frequency of 250 kHz. The frequencies of the aforementioned trains from the first to the fifth may in any case fall within the ranges previously described.

Each of the pulses trains has a number of pulses equal to at least four units, and due to the more and more increasing frequency, the duration of each train is reduced. It is also possible to observe that as the frequency increases, the amplitude of the pulses is progressively reduced. The overall length of the pulses train packet 510 is equal to 186 µs. The use of short duration pulses allows an effective treatment also of fluids whose movement, in particular in the magnetic field induction zone, is fast; the device object of the present disclosure is therefore particularly effective for treating waters channelled into ducts close to sinks, or distributors of drinking water, of coffee machines, or more generally of domestic utilities with a considerable demand for water.

Between one packet 510 and the subsequent one a pause of a determined length is predefined, preferably but not limitedly comprised between 180 µs and 3200 µs, more preferably comprised between 200 µs and 3000 µs and even more preferably comprised between 210 µs and 2900 µs. Using this particular type of pause optimizes the device's electricity consumption. The choice of the effective length of the pause between one pulses packet and the subsequent one is random, more precisely it is the subject of an electronic calculation of a pseudorandom number, comprised between a minimum value and a maximum value in accordance with the times indicated above. The electronic calculation of said pseudorandom number is executed by the microprocessor 200, during the emission of the pulses packet, and is in particular executed according to an automatic calculation procedure for which, upon emitting a new pulses packet 510, the aforementioned pseudorandom number is automatically calculated, so that at the end of the transmission of the packet, it is immediately clear which pause is to be assigned. In conjunction with the pause, the power stage 206 is deactivated.

The Applicant has observed in particular that for an effective elimination of limescale, rust and bacteria, in particular *Legionella*, it is preferable to supply the ferrite cores with an amplitude signal even less than 6 A, preferably less than or equal to 5.7 A, even more preferably lower than 5.6 A. The use of relatively low currents makes it possible to have a device that is intrinsically safe in use and also allows the dimensions of the device itself to be contained, since the supply stages and/or the transformers with which they can be made, can be made small-sized.

In a non-limiting embodiment, the pulses are emitted with a square wave, however the presence of the electrical conductor at least partially wound around the ferrite core, due to the inductive effect, partially modifies the waveform thereof into a sinusoidal or triangular one. This modification does not imply an alteration of the substantially null value on the pulses train.

The Applicant observes that at least the partial winding of the conductor 109 is possible, it can be made into a simple ring or by means of a plurality of turns, preferably wound around the shoulder of the "C".

In use, the operator first applies the ferrite cores around a duct 400 within which the fluids to be treated flow, so that said duct is at a predetermined distance from the walls of the ferrite cores, and in particular is surrounded thereby.

Subsequently, the conductor 109 which supplies the radiofrequency signal to the ferrite cores at the output 1010 of the radiofrequency generator 101 is connected, so that at least one, and preferably a sequence of pulses packets 510 in turn comprising at least a first pulses train 103 and a second pulses train 104 is generated; said first pulses train 103 having a first predefined frequency f1; said second pulses train 104 having a second predefined frequency f2; said first predefined frequency f1 being distinct from the second predefined frequency f2.

The Applicant has conceived further embodiments of the radiofrequency generator, conceived to emit a predefined number of pulses packets per second. Such embodiments are described in detail below.

A first embodiment of such a generator is configured to generate a pulses packet 510 comprising:
- a first pulses train 103, preferably 5 in number, with a frequency equal to 91 kHz, and in any case comprised in the range between 80 kHz and 100 kHz;
- a second pulses train 104, preferably 5 in number, with a frequency equal to 111 kHz, and in any case comprised in the range between 100 kHz and 130 kHz;
- a third pulses train 105, preferably 5 in number, with a frequency equal to 143 kHz, and in any case comprised in the range between 130 kHz and 160 kHz;
- a fourth pulses train 106, preferably 5 in number, with a frequency equal to 200 kHz, and in any case comprised in the range between 160 kHz and 250 kHz.

Also in this case, the pulses of each first and/or second and/or third and/or fourth pulses train can each have their own first, second, third and fourth frequency, and/or can follow one another seamlessly.

The Applicant has conceived in particular a version of the device object of the present disclosure, in which the supply of the radiofrequency generator is substantially equal to 6V, and capable of emitting 1550 pulses packets 510 per second (in any case between 1450 and 1650 packets/s). The Applicant has conceived in particular a further version of the device object of the present disclosure, in which the supply of the radiofrequency generator is substantially equal to 9V, and capable of emitting 675 pulses packets 510 per second (in any case between 600 and 750 packets/s). The Applicant has also conceived a further embodiment of the device of the present disclosure, in which the supply of the radiofrequency generator is substantially equal to 12V, and capable of emitting 574 pulses packets 510 per second (in any case between 500 and 600 packets/s). The Applicant has finally conceived a further embodiment of the device object of the present disclosure, in which the supply of the radiofrequency generator is substantially equal to 15V, and capable of emitting 306 pulses packets 510 per second (in any case between 250 and 350 packets/s). The Applicant has conceived a family of radiofrequency generators in which there is an inverse law between the supply voltage and the number of packets per second.

As in the cases described above, the pauses 120 between one packet and the other one can have a predefined length or, alternatively, a random length.

A further embodiment of the device object of the present disclosure is characterized in that the radio frequency generator 101 is configured to emit a frequency signal variable between 40 kHz, preferably 45 kHz, and 400, preferably 350 kHz, emitting a number of pulses packets 510 in a number equal to 6600 packets per second, more generally in a number comprised between 6000 packets/s and 7000 packets/s. For example, the pulses packet 510 can be a pulses packet comprised between 1 and preferably 10 pulses, all with a frequency equal to 167 kHz, and be followed by a packet, always for example in a number comprised between 1 and preferably 10 impulses, each with a frequency equal to 255 kHz.

Figure 4:
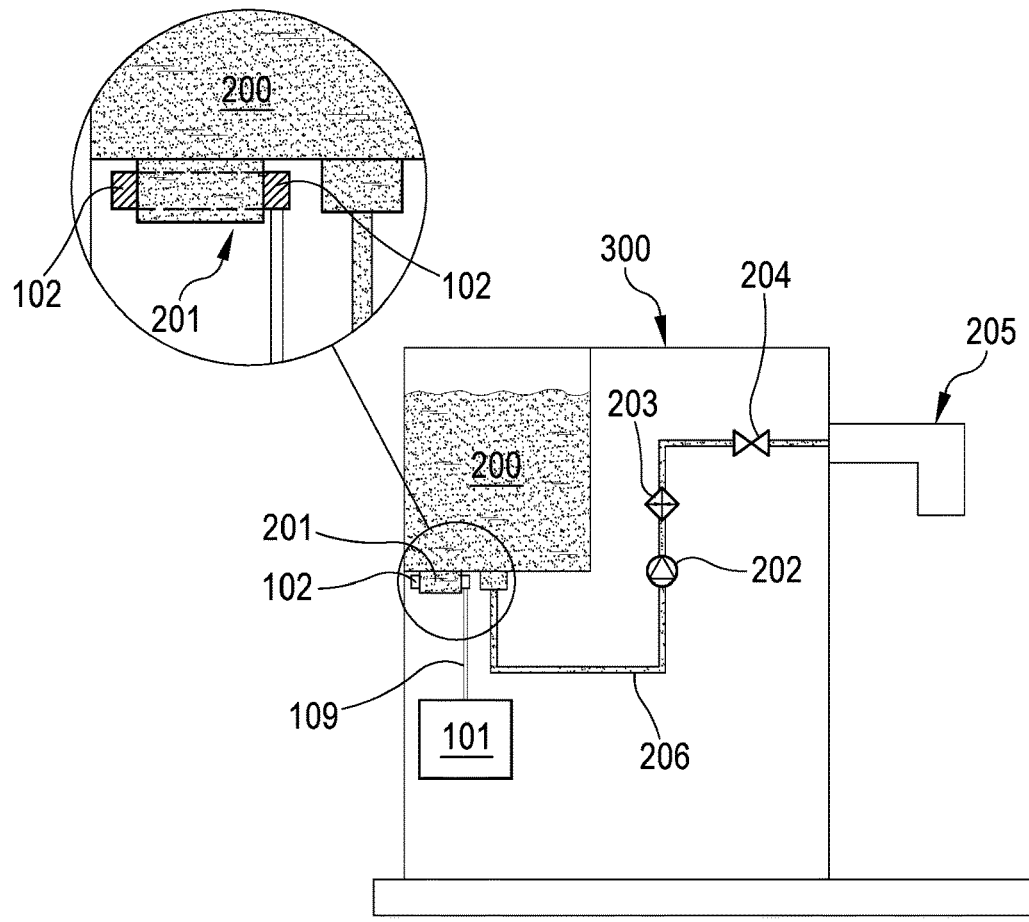
FIG. 4 illustrates a first example of a machine for distributing beverages in accordance with the present disclosure.
Figure 5:
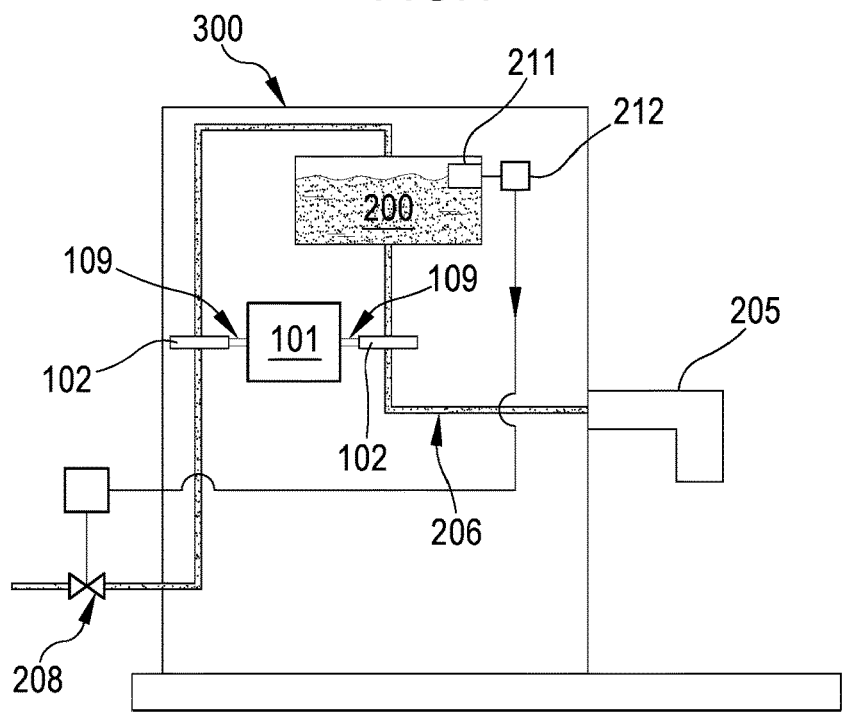
FIG. 5 illustrates a second example of a machine for distributing beverages in accordance with the present disclosure.

The electromagnetic field inductor element 102 is also adapted to be installed at a tank 200 adapted to contain fluids. In particular, FIG. 4 and FIG. 5 illustrate two configurations of a machine for distributing beverages, for example and not limitedly a machine for distributing coffee. As illustrated in FIG. 4, this machine, which is also the object of the present disclosure, comprises a body 300 within or at which a tank 200 adapted to contain liquid, preferably water, and a duct 206 connected to the tank 200 through which part of the liquid for dispensing the beverage is taken, are positioned. The machine 300 also comprises a pump 202, preferably of the electric type, supplied by the duct 206 and in turn supplying a heater 203 which can be selectively activated or deactivated in accordance with the specific type of beverage to be dispensed. A solenoid valve 204 can also be present downstream of the pump 202 and/or of the heater 203, in order to allow the liquid to be supplied in use towards a dispenser 205 at which a capsule for distributing beverages and/or a dosing and/or filter element for powder or granule products for distributing beverages can be positioned.

Inside the body of the machine 300 there is also a generator of frequency signals 101, in accordance with the characteristics described above. In particular, the cable 109 connected to the output 1010 of the radiofrequency generator 101 supplies an electromagnetic field inductor 102 which is installed at a recess of the tank 200; said recess is indicated by the reference number 201 and is positioned in a lower portion of the tank 200, preferably at the bottom wall, in such a way as to be always filled in use by the liquid contained in the tank itself. The recess 201 has a circular plan, for example, and extends convexly towards the outside of the tank 200, forming a portion of tank around which the aforementioned electromagnetic field inductor 102 is positioned in a predetermined positional relationship; said electromagnetic field inductor 102 is for example and not limitedly installed by contrast insertion on the wall that is convex towards the outside of said recess. In this way, the electromagnetic radiation induced on the recess can spread freely throughout the liquid of the tank 200, since the area of tank 200, more precisely of said recess 201, enclosed by the electromagnetic field inductor 102 is likely to comprise, in use, some liquid contained in said tank 200 and/or in said recess 201. Preferably, although not limitedly, the electromagnetic field inductor 102 in this case comprises a ferrite core with closed shape, preferably of the annular and/or toroidal type, coupled to the outwardly convex surface of said recess 201 for example and not limitedly by means of a contrast insertion and/or by mutual gluing.

FIG. 5 illustrates an alternative embodiment for the machine for distributing beverages 300, in particular a "retail" type machine or for distributing beverages in public places. This machine 300 is supplied from a liquid distribution network, for example from the water network, through a solenoid valve 208, which has at least a first open configuration and a second closed configuration. The solenoid valve 208 is connected to a tank 200 through a delivery duct 207; said delivery duct can be similar to the duct 400 previously described. The introduction of the liquid into the tank 200 takes place for example and not limitedly by dripping from above. In the tank 200 there is a float 211, connected operatively with a control unit 212 in such a way that when the liquid level in the tank 200 decreases below a predetermined and first threshold (minimum level threshold), the control unit 212 activates an electric opening command towards the solenoid valve 208, so that the latter can allow the admission of new liquid into the tank 200. The opening of the solenoid valve 208 can be timed; alternatively, the solenoid valve 208 can be closed by means of an electric closing command imposed by the control unit 212 when the float 211 detects a level of liquid in the tank 200 above a predetermined and second threshold (maximum level threshold). From the tank 200 a beverage dispensing duct departs which connects the latter to a dispenser 205 at which a capsule for distributing beverages and/or a dosing and/or filter element for powdered or granular products for distributing beverages can be positioned. The delivery duct can be similar to the duct 400 previously described. Although in the machine 300 illustrated in FIG. 5 they are not represented, a pump and a heater such as those described for the machine 300 according to FIG. 4 may be present.

The machine 300 according to the embodiment of FIG. 5 is characterized by the presence of two electromagnetic field inductors 102, each one supplied for example through its own cable 109. A first electromagnetic field inductor 102 is installed upstream of said tank 200, while a second electromagnetic field inductor 102 is installed downstream of said tank 200. More particularly, the first electromagnetic field inductor 102 is installed at the delivery duct 207, while the second electromagnetic field inductor 102 is installed at the delivery duct. This particular configuration allows an optimal protection of the machine 300 to be obtained, and is useful since the diffusion of the electromagnetic field in the fluid is possible only when there is continuity in the same, and is particularly useful in those cases in which there is no continuity of fluid between the delivery duct 207 and tank 200.

Recent studies carried out by the Applicant have observed that by means of the device and the process of irradiation of the water described herein, although aimed at reducing the bacterial load of the water in the form described above, it also allows reducing its resistance. From a comparative analysis of resistance to antibiotic tests carried out on water treated with the device described herein and, in parallel on untreated water, a lower resistance of bacterial agents in the treated water was however observed.

The device described herein, although mainly aimed at treating clean waters, can also be used in the treatment of waste water.

Parts of the process or method described in the present disclosure can be—when possible—carried out by means of a data processing unit, technically replaceable with one or more electronic processors designed to execute a portion of a predefined software or firmware program loaded on a non-transient storage medium. This software program can be written in any known programming language.

The data processing unit can be a processor of the general purpose type specifically configured through said software or firmware program to execute one or more parts of the method identified in the present disclosure, or be a dedicated ASIC or processor, specifically programmed to execute at least part of the operations of the method or process of the present disclosure.

The non-transient storage medium for containing the aforementioned software or firmware program portion can be internal or external to the processor itself, possibly also external to the electronic processor, and can—specifically—be a memory geographically located remotely with respect to the electronic processor. The storage medium can also be physically divided, in the form of a "cloud".

Finally, it is clear that additions, modifications or variants that are obvious to a person skilled in the art can be applied to the object of the present disclosure without thereby departing from the scope of protection provided by the appended claims.

The invention is not limited to the embodiments illustrated in the attached figures. Therefore, it is to be understood that when the features mentioned in the claims are followed by reference marks or numbers, such marks or numbers are included for the sole purpose of increasing the intelligibility of the claims, and are not to be construed in any way as limiting the scope of protection of claims.

The invention claimed is:

1. A device for treating fluids, comprising:
   at least one electromagnetic field inductor element made of magnetically permeable material, configured to be coupled in a predefined positional relationship with respect to a duct or tank within which fluids are likely to be present,
   a radiofrequency generator, comprising an output configured to supply a radiofrequency signal to the electromagnetic field inductor element,
   wherein said radio frequency generator comprises an operating configuration in which it generates a signal comprising at least one pulses packet in turn comprising at least a first pulses train and a second pulses train, said first pulses train having a first predefined frequency, said second pulses train having a second predefined frequency; said first predefined frequency being distinct from the second predefined frequency.

2. The device according to claim 1, wherein said first pulses train has a frequency lower than the frequency of said second pulses train and/or the first predefined frequency is lower than the second predefined frequency and/or wherein the first pulses train has a first maximum amplitude and said second pulses train has a second maximum amplitude distinct from the first maximum amplitude; said second maximum amplitude being lower than the first maximum amplitude, said pulses packet having a substantially null average value.

3. The device according to claim 1, wherein each of the pulses of the first pulses train has, as its own frequency, said first predefined frequency and each of the pulses of the second pulses train has, as its own frequency, said second predefined frequency, and/or wherein the first predefined frequency is the own frequency of each of the pulses of the first pulses train and the second predefined frequency is the own frequency of each of the pulses of the second pulses train.

4. The device according to claim 1, wherein the radiofrequency generator is configured to generate pulses and/or pulses trains of a square wave type.

5. The device according to claim 1, wherein in at least one of said first and second pulses train, the pulses of a respective pulses train follow one another seamlessly.

6. The device according to claim 1 wherein the first pulses train comprises a plurality of pulses, wherein at least two pulses of said first pulses train have an equal peak and/or peak-to-peak amplitude; and/or wherein the second pulses train comprises a plurality of pulses, wherein at least two pulses of said second pulses train have a peak and/or peak-to-peak amplitude identical to each other.

7. The device according to claim 1, wherein the pulses packet comprises pulses having a frequency less than 500 kHz, or comprised between 30 kHz and 270 kHz, or comprised between 40 kHz and 260 kHz, or comprised between 50 kHz and 250 kHz.

8. The device according to claim 1, wherein the pulses packet comprises a third pulses train, a fourth pulses train and a fifth pulses train placed in time sequence to said second pulses train, and wherein the third pulses train has a third predefined frequency, the fourth pulses train has a fourth predefined frequency, and the fifth pulses train has a fifth predefined frequency distinct from each other.

9. The device according to claim 8, wherein the first predefined frequency is comprised between 40 KHz and 60 KHz, or equal to 50 KHz; the second predefined frequency is comprised between 80 KHz and 100 kHz, or equal to 90 KHz; the third predefined frequency is comprised between 120 KHz and 140 kHz, or equal to 130 kHz; the fourth predefined frequency is comprised between 210 kHz and 230 kHz, or equal to 220 kHz; the fifth predefined frequency is comprised between 240 KHz and 260 kHz, or is equal to 250 kHz.

10. The device according to claim 1, wherein each pulses train between said at least a first pulses train and a second pulses train optionally between the first, the second, a third, a fourth and a fifth pulses train have a characteristic pair peak amplitude-frequency, wherein as the frequency increases, the peak amplitude is reduced and/or wherein the peak amplitude varies with law inversely proportional to the frequency.

11. The device according to claim 1, wherein said radiofrequency generator, in said operating configuration, generates a sequence of pulses packets separated from each other by a pause with a length comprised between a first minimum value and a second maximum value;
wherein the pulses packet has a predefined time length, or the sequence of pulses packets comprises a plurality of packets with predefined length;
wherein said predefined time length is comprised between 150 μs and 200 μs;
and wherein the first minimum value is ≥180 μs, or ≥200 μs, or ≥210 μs, and/or the second maximum value is ≤3200 μs, or ≤3000 μs, or ≤2900 μs.

12. The device according to claim 1, wherein the pulses packet comprises at least a first pulses train with a frequency comprised between 80 KHz and 100 kHz, optionally a first pulses train with a frequency equal to 90 kHz,
wherein the pulses packet comprises at least a second pulses train with a frequency comprised between 100 KHz and 130 kHz, optionally a second pulses train with a frequency equal to 111 kHz,
optionally wherein:
the pulses packet comprises at least a third pulses train with a frequency comprised between 130 kHz and 160 kHz, optionally a third pulses train with a frequency equal to 143 kHz,
and wherein the pulses packet comprises at least a fourth pulses train with a frequency comprised between 160 KHz and 250 kHz, optionally a fourth pulses train with a frequency equal to 200 kHz.

13. A machine for distributing beverages, comprising a tank, configured to contain in use a liquid for distributing beverages, and comprising a dispenser configured to allow the beverages comprising said liquid to be dispensed and configured to removably accommodate a capsule for distributing beverages and/or for mixing or dosing and/or filtering powdered or granular products for making said beverages; said machine comprising the device for treating fluids according to claim 1.

14. The machine according to claim 13, wherein said tank has an outwardly convex recess, at which an electromagnetic field inductor element is installed in a predetermined positional relationship.

15. A method for treating fluids, comprising:
providing a coupling between at least one electromagnetic field inductor element made of magnetically permeable material and a duct and/or tan for fluids, in such a way that said coupling occurs through a predefined positional relationship,
generating a radiofrequency signal comprising at least one pulses packet in turn comprising at least a first pulses train and a second pulses train; said first pulses train having a first predefined frequency; said second pulses train having a second predefined frequency; said first predefined frequency being distinct from the second predefined frequency;
supplying, through the output of a radiofrequency generator, the radiofrequency signal in said electromagnetic field inductor element.

16. The method according to claim 15, wherein the coupling is such that said duct is at least partially enclosed within said electromagnetic field inductor element and/or is such that said electromagnetic field inductor element is positioned in correspondence of at least one recess of said tank, said recess being convex towards the outside.

17. The method according to claim 15, comprising:
a step of positioning said electromagnetic field inductor element in correspondence of at least part of a non-metallic duct, so that at least a part of the magnetic flux generated through the electromagnetic field inductor element floods and/or runs through said non-metallic duct in a direction at least partially orthogonal with respect to the direction of maximum extension of said duct and/or to the direction of flow in use of the fluid inside said non-metallic duct;
an optional step of positioning said electromagnetic field inductor element at at least part of a tank, in particular of said outwardly convex recess, so that the area of tank and/or of said recess enclosed by said electromagnetic field inductor is likely to comprise, in use, some liquid contained in said tank and/or in said recess;

said electromagnetic field inductor element comprising at least one "C"-shaped ferrite core, optionally a pair of "C"-shaped ferrite cores, oriented in an opposite way and juxtaposed each other, and the positioning of said electromagnetic field inductor element is such that the non-metallic duct and/or said recess, is with regards to a portion thereof inside the concavity delineated by said "C" and/or inside the cavity made by said pair of "C"-shaped ferrite cores.

18. The method according to claim 15, wherein the first pulses train is obtained by generating a plurality of pulses, each of which assumes said first predefined frequency and/or wherein the second pulses train is obtained by generating a plurality of pulses, each of which assumes said second predefined frequency.

19. The method according to claim 15 wherein the generation of a radiofrequency signal comprises the generation of a square wave signal, and/or the pulses of the at least first pulses train and/or of the at least second pulses train are square wave pulses.

20. The method according to claim 15, wherein in at least one of said first and second pulses train, the pulses of the respective pulses train follow one another seamlessly.

* * * * *